United States Patent [19]

Higgins et al.

[11] 3,713,141

[45] Jan. 23, 1973

[54] SYNCHRO-TO-DIGITAL CONVERSION METHOD AND APPARATUS

[75] Inventors: Roger K. Higgins; Andrew T. Sheets, Silver Spring, Md. 20910

[73] Assignee: The United States of America as represented by t ie Secretary of the Navy

[22] Filed: May 21, 1971

[21] Appl. No.: 145,660

[52] U.S. Cl. ..........................................340/347 SY

[51] Int. Cl. ..........................................H03k 13/17

[58] Field of Search ..................340/347 SY, 347 AD

[56] References Cited

UNITED STATES PATENTS 3,564,539 2/1971 Dew ..............................340/347 SY
3,480,946 11/1969 Di Meo..........................340/347 SY
3,516,084 6/1970 Sacks et al.....................340/347 SY

*Primary Examiner*—Thomas A. Robinson
*Attorney*—R. S. Sciascia, J. A. Cooke and R. J. Erickson

[57] ABSTRACT

A method and apparatus for converting input synchro data, received in the form of a pair of signals representing, for example, the sine and cosine of a synchro shaft angle whose quadrant is predetermined, into a weighted binary number accurately identifying the synchro angle. Circuitry performs two successive steps of angle subtraction from the input synchro angle until a resultant angle between 0° and 11.25° is obtained for which an accurate linear approximation can be made.

13 Claims, 3 Drawing Figures

INVENTORS
ROGER K. HIGGINS
BY ANDREW T. SHEETS

ATTORNEY

INVENTORS
ROGER K. HIGGINS
BY ANDREW T. SHEETS

SYNCHRO-TO-DIGITAL CONVERSION METHOD AND APPARATUS

BACKGROUND OF THE INVENTION

A number of conversion methods and apparatus have been previously proposed for obtaining a weighted binary number from a synchro shaft angle representation. However, for one reason or another, all of these prior synchro-to-digital converters have deficiencies which limit their usefulness and often make them incompatible with the over-all control system.

For example, as is well known to those skilled in the data conversion art, input synchro signals may be converted, in many ways, into voltage signals that represent the sine and cosine respectively of the shaft angle $\theta$ and, from the polarities and amplitudes of these signals, a three bit octant code specifying in which octant the input synchro angle $\theta$ lies is readily developed. Moreover, there are various methods, previously proposed, for performing synchro-to-digital conversion for an angle less than or equal to 45°. However, it has been found that these prior art converters often cannot be used in specified practical applications either because they require too much hardware or because they are not very accurate. For example, the so-called look-up table method utilizes a hard wired magnetic core storage table which permits a digital number to be entered and a corresponding number to be read out in a few microseconds. Although this method of synchro-to-digital conversion is fast and quite accurate, the look-up table, for a reasonably long digital number (e.g., 10 bits) requires a substantial amount of hardware.

There are also several methods of synchro-to-digital conversion that utilize digital logic circuitry to generate signals that correct for the non-linearity of the trigonometric functions encountered in the conversion process. These are referred to generally as digital correction or function generation methods of synchro-to-digital conversion. Here again, however, in order to achieve a reasonable accuracy, these methods require too much hardware for most practical applications.

Another method previously proposed for performing synchro-to-digital conversion is the so-called break point and slope method. This method requires the tangent curve to be divided into a sufficient number of segments so that a linear conversion can be made on each segment, with the resultant number remaining within the desired accuracy. This method, however, requires setting the initial offset and slope of each segment on the tangent curve and has a limited accuracy.

A so-called two segment approximation method of synchro-to-digital conversion has also been previously proposed and utilizes the following approximation to correct for the non-linearity in the tangent curve:

$$\psi = 45\ A \sin\theta - B \cos\theta/\cos\theta + C \sin\theta$$

where $\psi$ is the encoder output angle and $\theta$ is the input angle. This method is slightly more complex and provides a slightly better accuracy that the break point and slope method mentioned above.

A still further previously proposed method for synchro-to-digital conversion is the so-called angle subtraction method wherein the following trigonometric identities are used to subtract a known angle from the unknown input angle to the converter:

$$\sin(x-y) = \sin x \cos y - \cos x \sin y$$

$$\cos(x-y) = \cos x \cos y = \sin x \sin y.$$

This process can be continued for as many trials as necessary to achieve the desired accuracy, with the unknown angle determined by adding the values of angles that have been subtracted. On the other hand, this trial method requires an excessive amount of hardware to fully implement it on a resistive encoder. However, it does have the desirable feature of providing a mathematically correct answer.

SUMMARY OF THE INVENTION

In accordance with the present invention, an improved method and apparatus for performing synchro-to-weighted binary number conversion are provided which utilize a combination of two angle subtractions followed by a linear approximation over a single segment of the input synchro angle. The proposed method and apparatus perform this conversion very accurately, with a maximum error of the linear approximation being approximately 20 seconds of arc, and moreover, require substantially less hardware than any of the prior art converters previously discussed.

More specifically and as previously discussed, in accordance with the present invention, the angle to be encoded by successive approximation is always equal to or less than 45°; i.e., octant determination has been performed, and the input to the converter is in the form of a pair of voltage signals representing respectively the sine and cosine of an angle $\theta$ which is somewhere between 0° and 45°. The first step in the proposed conversion process is to subtract the trigonometric equivalent of an angle of 22.5° from the input angle $\theta$ and to test the sine of the resultant angle to see if it is positive or negative. If the sine (and therefore the resultant angle) is negative, the original angle is restored so that in either case the sine/cosine pair that results from the first angle subtraction test represents an angle which is positive and between 0° and 22.5°. The next step utilized in the proposed synchro-to-digital conversion process is to subtract the equivalent of an angle of 11.25° and to test the result as before, so that the resultant angle is positive and between 0° and 11.25°. Over this range, it is proposed in accordance with the present invention to perform a simple linear approximation that is sufficiently accurate to have negligible affect on the over-all conversion accuracy.

In view of the foregoing, one object of the present invention is to provide an improved method and apparatus for converting synchro shaft angle data into a multi-bit weighted binary number.

A further object of the invention is to provide an improved method and apparatus for performing synchro-to-digital conversion comprising a combination of angle subtraction steps and a linear approximation of the remaining angle.

A further object of the present invention is to provide an improved method and apparatus for performing synchro-to-digital conversion in response to a pair of input voltage signals representing the sine and cosine respectively of the input synchro angle equal to or less than 45° and which is converted to a multi-bit weighed binary number by performing two angle subtractions and a single step of linear approximation over a angular range small enough to maintain very high conversion accuracy.

Other objects, purposes and characteristic features of the present invention will in part be pointed out as the description of the invention progresses and in part be obvious from the accompanying drawings, wherein.

Figure 1:
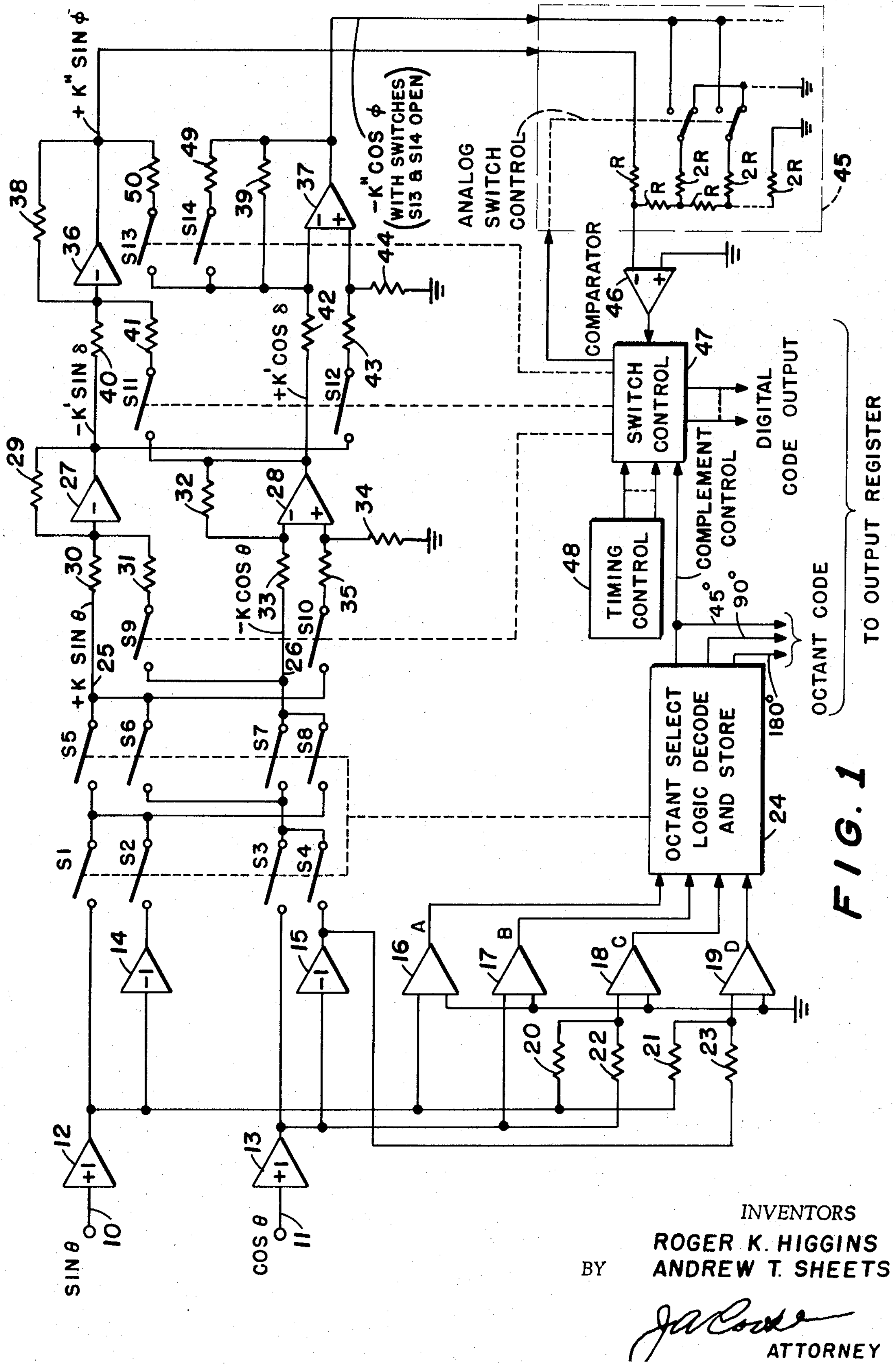
FIG. 1 is a block diagram of synchro-to-digital conversion apparatus representing one embodiment of the present invention.

Referring now to the drawings and particularly to the over-all block diagram of FIG. 1, the proposed synchro-to-weighted binary number conversion apparatus of the present invention receives the input synchro data in the form of a voltage signal pair designated SIN $\theta$ and COS $\theta$ on input lines 10 and 11 respectively. By way of example, these voltage signals appearing at 10 and 11 could, if desired, be produced by utilizing conventional Scott "T" input transformers to initially convert the synchro signals into the voltage signals representing the sine and cosine of the shaft angle $\theta$.

The SIN $\theta$ and COS $\theta$ voltage signals are applied, through buffer amplifiers 12 and 13 respectively, directly to switches S1 and S3 and indirectly, through inverter amplifiers 14 and 15 respectively, to switches S2 and S4. The outputs of buffer amplifiers 12 and 13 are also applied, along with the output of inverter amplifier 15, to a plurality of octant detecting comparator stages 16, 17, 18 and 19 for the purpose of detecting the octant value of the input angle $\theta$. More specifically, the sin $\theta$ output of buffer amplifier 12 is connected directly to one input of comparator 16 and, through resistors 20 and 21 respectively, to summing junctions at the inputs of comparator stages 18 and 19. On the other hand, the second input connection for each of the comparator stages 16 through 19 are connected to ground. Similarly, the cos $\theta$ output from buffer amplifier 13 is connected directly to one input of comparator stage 17 and, through resistor 22, to the summing junction for comparator stage 18. The second input to the stage 19 is applied from the output of the inverter amplifier stage 15.

Figures 2, 3:
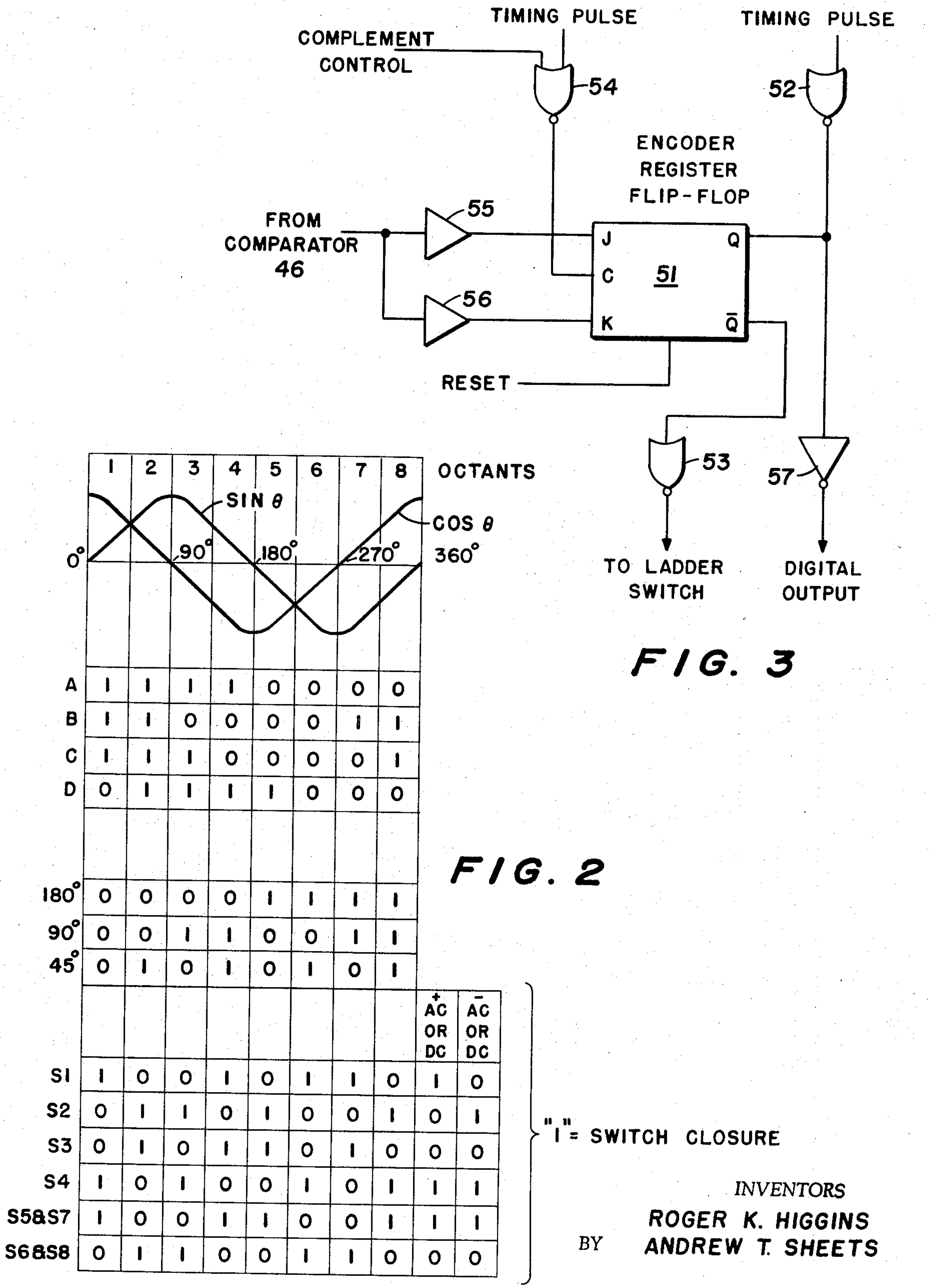
FIG. 2 is a diagrammatic illustration of the sine and cosine curves for an input synchro angle $\theta$ and of the corresponding logic function tables associated with the embodiment of FIG. 1.
FIG. 3 is a block diagram of a typical logic circuit employed in the switch control apparatus forming part of the embodiment of FIG. 1.

The comparator stages 16 through 19 operate to produce associated logic output signals designated at A, B, C, and D respectively in FIGS. 1 and 2 to uniquely indicate in which of the eight possible octants the input synchro angle $\theta$ exists. These logic signals A through D from the comparators 16 through 19 are applied to suitable octant select logic, decode and store circuitry 24, of conventional design, which produces a three-bit octant code on the lines designated 45°, 90° and 180° in FIG. 1, according to the truth table illustrated in FIG. 2. The circuitry 24 also functions to selectively operate the switches S1 through S8 of FIG. 1, according to the truth table shown in the lowermost portion of FIG. 2. By way of example, when the input angle $\theta$ is detected (by the detector comparator stages 16 through 19) as being in the third octant, the switches S1, S3, S5 and S7 are controlled to their open position; whereas, the switches S2, S4, S6 and S8 are operated to their closed positions. As mentioned previously, the octant detecting circuitry of FIG. 1 is conventional and has been shown and described here merely to disclose its relationship with the proposed conversion method and apparatus of the present invention which convert a pair of voltage signals representing the sine and cosine of an angle equal to or less than 45° into a multi-bit weighted binary digital output code. More specifically, this voltage signal pair appears on input lines 25 and 26 at the output of the switching network S1 through S8 and is designated as K sin $\theta$ and − K cos $\theta$ in FIG. 1, corresponding to the identity and polarity of the signals in this pair within the first octant (see lowermost portion of the truth table of FIG. 2). In these expressions, the term K represents a constant.

The first step in the proposed synchro-to-digital method of the present invention is to subtract the trigonometric equivalent of an angle of 22.5° from the input angle (between 0° and 45°). This is accomplished by means of a pair of operational amplifiers 27 and 28 connected to receive the K sin $\theta$ and − K cos $\theta$ voltage signals respectively. Specifically, the operational amplifier stage 27 includes single input and output terminals between which is connected a feedback resistor 29 of predetermined value R The amplifier 27 is provided with a summing junction to which is connected one side of a resistor 30 whose value is also R. The other side of resistor 30 is connected to input line 25 and receives the K sin $\theta$ input signal. Also applied to the summing junction for operational amplifier 27, through resistor 31 and switch S9, is the − K cos $\theta$ signal appearing on line 26. The value of resistor 31 is chosen to be $R$/tan 22.5° for reasons to be discussed hereinafter.

On the other hand, the operational amplifier 28 has a single output terminal and two input terminals, one of which is connected to the output of amplifier 28 through feedback resistor 32. This same input terminal for amplifier 28 is also connected to a summing junction which, in turn, is connected through resistor 33 to input line 26 and the − K cos $\theta$ signal. The resistors 32 and 33 are of the same resistance value $R$. The other input terminal for the amplifier 28 also has an associated junction which is connected, through resistor 34, to ground and, through resistor 35 and switch S10, to line 25 and the K sin $\theta$ signal. The resistor 34 has a value given by the expression $R$ tan 22.5°12 − tan 22.5°; whereas, resistor 35 has a value $R$.

In order to demonstrate how the circuitry associated with operational amplifiers 27 and 28 performs the desired subtraction of the trigonometric equivalent of 22.5° from the input angle $\theta$, it would first be recalled that the sine and cosine of the difference between two angles may be expressed as follows:

$$K \sin(\theta-\omega) = K \sin\theta \cos\omega - K \cos\theta \sin\omega \quad (1)$$

$$K \cos(\theta-\omega) = K \cos\theta \cos\omega + K \sin\theta \sin\omega \quad (2)$$

If, in each of the equations (1) and (2), both sides of each equation are divided by cos $\omega$, these equations can be rewritten in the following form:

$$K(\sin\theta - \cos\theta \tan\omega) = K/\cos\omega \sin(\theta-\omega) = \overline{K'} \sin\delta \quad (3)$$

$$K(\cos\theta + \sin\theta \tan\omega) = K/\cos\omega \cos(\theta-\omega) = \overline{K'} \cos\delta \quad (4)$$

where $\omega$ is the angle to be subtracted from the input angle $\omega$ and is initially equal to 22.5°, and $\delta = \theta - \omega$.

As shown in FIG. 1, the term $-\cos\theta\tan\omega$ of equation (3) is obtained by applying the signal which appears on line 26 to the summing junction of the operational amplifier 27, through switch S9 and resistor 31 which as previously mentioned, has a value $R/\tan 22.5°$ in order to provide the proper gain factor; whereas, the $\sin\theta$ term is obtained by merely applying the signal on line 25 to this same summing junction through resistor 30, of value $R$. According to equation (3), the resulting output from operational amplifier 27 is thus given by the expression $-K'\sin\delta$, assuming the usual inversion takes place.

In equation (4) above, where it is necessary to generate the term $\sin\theta\tan\omega$, the plus (+) input terminal of the operational amplifier 28 is used in order to sum the voltages correctly. The proper gain factor is then obtained by properly selecting the value of the resistor 34 connected between the plus=) input terminal for amplifier 28 and ground. To illustrate how the value of this resistor 34 is determined, it should be noted that the ratio of the output voltage ($e_o$) to the input voltage ($e_i$) for operational amplifier 28 is given by the expression:

$$e_o/e_i = R_{34}/(R_{35}+R_{34})\ (1=(R_{32}/R_{33})\qquad (5)$$

If this expression is set equal to $\tan\omega$ or the desired gain for the amplifier 28, the gain (A') of this amplifier stage can then be expressed as:

$$A' = 2R_{34}/(R_{35}+R_{34}) = \tan\omega,\qquad (6)$$

inasmuch as $R_{32}=R_{33}$, as previously mentioned. Solving equation (6) for $R_{34}$, the proper value for this resistor is found to be $R\tan\omega/2-\tan\omega$, where $\omega$ is the angle to be subtracted or 22.5° in the present example.

In accordance with equations (3) and (4), the output voltage signals from this first set of operational amplifiers 27 and 28 are thus $-K'\sin\delta$ and $+K'\cos\delta$ respectively and have opposite polarities from the input voltage signals on lines 25 and 26. These two signals are subsequently applied to similar angle subtraction circuitry comprising operational amplifiers 36 and 37, feedback resistors 38 and 39, and input resistors 40, 41, 42 43 and 44 connected in exactly the same manner as in the amplifier stages 27 and 28. Resistors 38, 39, 40, 42 and 43 are of the same value $R$; resistor 41 has a value $R/\tan 11.25°$; and, resistor 44 has a value $R\tan 11.25°/(2-\tan 11.25°)$ so that the amplifier stages 36 and 37 perform a subtraction of the trigonometric equivalent of 11.25° from the angle $\delta$, in accordance with equations (3) and (4) above. It should be understood at this time that this angle $\delta$ which appears at the output of stages 27–28 and is inputted to stages 36–37 may be equal to either the original input angle $\theta$ less 22.5° or the input angle $\theta$ itself, depending respectively upon whether or not the result of the first angle subtraction step was a positive angle between 0° and 22.5°, but in any event the resulting angle $\delta$ produced at the output of the amplifiers 27 and 28 is always an angle between 0° and 22.5°; whereas, the output angle $\phi$ from the second subtraction stage pair 36–37 is always between 0° and 11.25°.

More specifically, switches S9 and S10 are included in the input circuits to operational amplifiers 27 and 28 respectively and in their closed positions provide cross-coupling of the input lines 25 and 26 to the amplifiers 28 and 27 respectively, in order to satisfy the angle subtraction equations (3) and (4) above. Similarly, switches S11 and S12 are utilized to perform this same cross-coupling of the output voltage signals from the amplifier stages 27 and 28 to the following amplifiers 37 and 36 respectively. If the angle subtraction performed at either amplifier stage 27–28 or stage 36–37 results in a negative angle; i.e., the angle subtracted is greater than the input angle to the stage, the associated pair of switches S9–S10 or S11–S12 is operated to the opened positions and the input angle to that stage is restored, as will now be described in detail.

Assume, for example, that switches S9 and S10 are closed and that an angle of 22.5° has been subtracted from the input angle $\theta$ at amplifiers 27 and 28, as previously described. The outputs from this angle subtraction circuitry thus represent the sine and cosine of the difference angle $\delta$; e.g., the signals $-K'\sin\delta$ and $K'\cos\delta$ in FIG. 1. The sine voltage signal at the output of amplifier 27 is applied, through amplifier 36, as one input to an $R/2R$ ladder and analog switch network 45, of conventional design, and subsequently to comparator 46 where this sine voltage signal is compared with ground potential. The switch control 47 responds to the comparison made at 46 and controls the operation of switches S9, S10, S11, and S12. More specifically, if the output of the comparator 46 indicates that the sine of the angle resulting from the subtraction of 22.5° from the input angle $\theta$ is positive ($22.5° < \theta < 45°$), switch control 47 maintains the switches S9 and S10 in a closed position. On the other hand, if the output of comparator 46, as sensed by switch control 47, indicates that the sine of the difference angle output from operational amplifier 27 is negative ($0° < \theta < 22.5°$) the switch control 47 immediately opens switches S9 and S10 and the input signals $K\sin\theta$ and $-K\cos\theta$ are merely amplified by stages 27 and 28 and appear at the outputs thereof, for subsequent application to the angle subtraction stages 36 and 37. In this manner, the amplifiers 27 and 28 are controlled to produce output voltages representing the sine and cosine respectively of an angle $\delta$ between 0° and 22.5°, corresponding to either the input angle $\theta$ or the input angle $\theta$ less 22.5°, depending upon the result of the first angle (22.5°) subtraction.

Similarly, at stages 36 and 37, an angle of 11.25° is subsequently subtracted from the angle $\delta$ and the sine voltage signal, at the output of amplifier 36, is applied through ladder and switch network 45 to the comparator 46 where the polarity of this sine voltage signal is also compared against ground and utilized, via switch control 47, in such a manner that switches S11 and S12 are maintained in a closed position only if the sine of the resultant angle $\phi$ is positive. On the other hand, if the comparator 46 detects that $\sin\phi$ is negative and therefore the angle $\delta$ is less than 11.25°, the switch control 47 opens switches 11 and 12 to reinstate the initial angle $\delta$ at outputs of operational amplifiers 36 and 37. In this manner, amplifiers 36 and 37 produce outputs representing respectively the sine and cosine of an angle between 0° and 11.25° over which angular range an accurate linear approximation is performed, in a novel manner, in accordance with the present invention.

Before proceeding with a discussion of this linear approximation portion of the proposed synchro-to-digital converter, it should be noted that inasmuch as switch control 47 is utilized to control the operation of switches S9 through S11, this switch control 47 can also serve as the source of a digital code (see FIG. 1) the operation of the analog switches contained in the network 45; and, the actual generation of the digital output code.

After the two angle subtractions of 22.5° and 11.25° have been made, as previously described, the two remaining voltages represent the sine and cosine of an angle $\phi$ between 0° and 11.25°. Over this limited range, a linear approximation is made to convert the angle $\phi$ into a straight weighted binary number. The equation for performing this approximation, in accordance with the present invention, is $$\text{angle } X \text{ (in degrees)} = 11.25\ (\sin\phi / A\cos\phi + B\sin\phi) \quad (7)$$

where angle $X$ is the remaining approximate angle between 0° and 11.25° to be converted into binary bit form and A and B are constants selected in accordance with desired accuracy. In practice, it has been found that a value of 0.7811 for constant $A$ and 0.07115 for constant $B$ provide an approximation within acceptable accuracy limits.

In the foregoing equation for angle $X$, the numerator is already directly available within the circuitry of FIG. 1, at the output of the operational amplifier 36, but the denominator must be generated. More specifically, the first term of the denominator is obtained by reducing the gain of the cosine signal amplifier 37 by switching in a shunt resistor in the feedback network. This shunt resistor, designated as 49, has a value of $(A/(1-A))R$ so that the gain of amplifier stage 37 is A rather than unity. The second term in the denominator of the above equation for approximating angle $\phi$, is obtained by cross-coupling the sin $\phi$ signal at the output of amplifier 36 to the summing junction at the input of the cosine signal amplifier 37, through a resistor 50 having a value $(A/b)R$. Two switches S13 and S14 perform the connections needed during the linear approximation portion of the proposed synchro-to-digital conversion method. These switches S13 and S14 are under the control of switch control network 47 and timing control 48 and can be closed before the angle subtraction steps are performed because the comparator 46 is testing only the polarity of the sin $\phi$ signal during the angle subtraction process.

As mentioned previously, the output signals from the operational amplifier stages 36 and 37 are applied to the $R/2R$ ladder and analog switch network 45 which, together with comparator 46 and switch control network 47, forms a conventional analog-to-digital converter network well-known to those skilled in the art whereby the output signals from amplifiers 36 and 37 are converted into a corresponding digital binary output code. More specifically, the details of the switch control 47 are shown in FIG. 3 of the drawings and comprise basically an encoder register formed of a plurality of flip-flop stages, one of which is shown at 51 in FIG. 3. By way of example, if the remaining angle $X$ as converted into a digital output code is to have ten bit positions, then ten flip-flops such as that shown typically at 51 would be included in the encoder register and would be operated by successive timing pulses from timing control 48 to perform the successive approximation of the angle $X$, as will now be described.

During a typical operation of the switch control circuitry, a timing pulse is supplied by timing control 48, through gate circuit 52, to the Q terminal of the flip-flop 51, causing the flip-flop 51 to be set with Q low and $\overline{Q}$ high. The $\overline{Q}$ signal in turn causes the output of the gate 53 to be low and thus operates a particular switch (or switches), in the ladder network 45, associated with the particular timing pulse being passed by the gate circuit 52 from the timing control network 48. This in turn, causes an associated voltage value corresponding with a predetermined value for the unknown angle $X$ to be applied to the comparator 46. In the embodiment shown in FIG. 1, for example, the signal representing $A$ cos $\phi$ + $B$ sin $\phi$ at the output of amplifier 37 is applied to the ladder network 45 and predetermined fractions of this reference signal are successively summed with and thus compared against the signal representing sin $\phi$, under the control of timing control network 48.

When the timing pulse through gate 52 terminates, a subsequent timing pulse from timing control 48 is initiated. This subsequent pulse is applied to the clock input (designated as $C$) of the flip-flop 51 through gate 54. This timing pulse causes the flip-flop 51 to toggle into the opposite state; i.e., with output Q high and $\overline{Q}$ low, if the signals from the comparator 46 to terminals J and K of flip-flop 51 through inverters 55 and 56 are low. On the other hand, if the signals applied to the input terminals J and K of flip-flop 51 from comparator 46, through inverters 55 and 56 are high, the state of the flip-flop 51 will not be changed. These actions are in accordance with the truth table associated with the illustrated logic circuitry of FIG. 3 and it would be obvious to one having ordinary skill in the art how to readily design logic to operate similar devices having different truth tables. In this manner, during the successive approximation, the plurality of flip-flops constituting the encoder register are sequentially controlled to either of their two possible operating conditions and thus form a digital code representation of the angle $X$, in accordance with equation (7) above.

Each encoder register flip-flop; e.g., flip-flop 51, remains in the operating condition or state to which it has been actuated, as just described, until the end of the successive approximation sequence. At that time, the timing control network 48 permits the 45° bit in the octant code to be examined. If this 45° bit is high, as occurs whenever the input angle $\theta$ is in the second, fourth, sixth, or eighth octant, the illustrated COMPLEMENT CONTROL line of FIG. 3 goes high and gate 54 goes low causing a clock pulse condition at all the encoder register flip-flops which will change the state of each flip-flop and therefore each bit in the register holding the binary digital number. This change of state of the flip-flops; e.g., flip-flop 51, in the encoder register thus performs a complementing of the number stored therein and in this case represents a subtraction of the input synchro angle $\theta$ from 45°. The final digital output from the encoder register appears at the output of inverter 57 for each flip-flop or bit stage where it can be strobed into the output register (not shown) of the synchro-to-digital converter, thereby freeing the rest of the converter so that it can convert a new angle. This digital number in the output register (not shown) represents an angle which can be determined by adding the bit weights of all bits which are in the "true" or binary one state. The most significant bit in this output code would have a weight of 180°, the next bit is 90°, the next is 45°, and so one for the remaining ten bits of the 13-bit weighted binary digital output code.

It should be recalled at this time that the typical switch control circuitry illustrated in FIG. 3 of the drawings and described hereinabove merely represents a single stage for handling one bit of the 10 bit code portion of the desired weighted binary digital output code. In other words, there would be a total of 10 flip-flops similar to flip-flop stage 51 of FIG. 3 in the entire encoder register and each would produce the corresponding bit output. As was also previously discussed, each of the flip-flops contained in the encoder register would be controlled by successive pairs of timing pulses from timing control 48, via gates such as are designated at 52 and 54 respectively in FIG. 3. Moreover, each of the flip-flops contained in the encoder register would preferably include the illustrated RESET input capability whereby the entire encoder register could be reset at any convenient time after the read-out of the digital code from the encoder register flip-flops.

Having described the structure and operation of the illustrated synchro-to-weighted binary converter apparatus of the present invention, it should be noted that more than two angle subtraction stages or steps could be performed prior to the successive approximation step, if increased accuracy is desired and if the resulting increase in necessary hardware is not objectionable. Of course, if the number of angle subtraction steps is increased, the values of the constants $A$ and $B$ in equation (7) would need to be re-calculated.

It should also be understood at this time that the illustrated apparatus can, if desired, be operated as a linear converter to convert scaler (AC or DC) inputs into corresponding weighted binary numbers, as well as in the synchro-to-weighted binary converter mode previously discussed. More specifically, when operated as a scalar-to-weighted binary converter, the unknown scalar signal and the associated reference signal would, after suitable sampling and storing, be applied to input lines 10 and 11 of FIG. 1 respectively. Comparator 16 would then initially perform a polarity determination on the input unknown scalar signal according, for example, to the truth table of FIG. 2 and would cause proper positioning of switches S1 and S2, as necessary to insure that the correct polarity signals appear on lines 25 and 26. Moreover, in this operating mode, switches S9–S12 would be left in their open positions to inhibit the angle subtraction circuitry; whereas, switches S13 and S14 would also be left in the open positions to inhibit the circuitry which performs the linear approximation of the 0° to 11.25° segment used in the synchro angle conversion. As a result, the ladder and switch network 45, the comparator 46, the switch control 47, and timing control 48 now operate, in combination, to perform a linear successive approximation of the ratio of the unknown input scalar signal and reference signal.

Various other modifications, adaptations and alterations of the present invention are of course possible in the light of the above teachings, without departing from the spirit or scope of the appended claims. It should therefore be understood at this time that the invention may be practiced otherwise than as specifically described hereinabove.

What is claimed is:

1. A method for converting input synchro data received in the form of a first pair of signals representing the sine and cosine respectively of an unknown input angle equal to or less than 45°, into a binary digital output code identifying said angle, comprising the steps of:

performing, by means of said first pair of signals, a subtraction of the trigonometric equivalent of an angle of 22.5° from said unknown input angle to obtain a second pair of signals representing the sine and cosine respectively of a first resultant angle, determining by means of the sine signal of said second pair of signals whether the sine of said first resultant angle is positive or negative, replacing said first resultant angle by said unknown input angle if the sine of said first resultant angle is negative thereby causing said second pair of signals to represent the sine and cosine respectively of said unknown input angle, performing, by means of said second pair of signals, a subtraction of the trigonometric equivalent of an angle of 11.25° from either said first resultant angle or said unknown input angle depending respectively upon whether the sine of said first resultant angle is positive or negative, to obtain a third pair of signals representing the sine and cosine respectively of a second resultant angle, determining by means of the sine signal of said third signal pair whether the sine of said second resultant angle is positive or negative, replacing said second resultant angle by said first resultant angle if the sine of said second resultant angle is negative and the sine of said first resultant angle is positive, replacing said second resultant angle by said unknown input angle if the sines of both said first and second resultant angles are negative, whereby said third pair of signals always represents the sine and cosine respectively of an angle between 0° and 11.25°, performing by means of said third pair of signals a linear approximation of said angle between 0° and 11.25° according to the equation $$\text{Angle } X \text{ (in degrees)} = 11.25 \sin \phi / A \cos \phi + B \sin \phi$$

where angle $X$ is the remaining approximate angle to be converted to binary bit form, $\phi$ is said angle between 0° and 11.25°, and $A$ and $B$ are constants of predetermined values selected in accordance with desired accuracy, and converting said remaining angle $X$ into a group of binary digital code output bits by a successive approximation analog-to-digital conversion technique.

2. The method of synchro-to-digital conversion as specified in claim 1 wherein each of said two steps of subtracting the trigonometric equivalent of a known first angle $\omega$ from an unknown second angle $\theta$ comprises the steps of, multiplying a signal representing $-\cos\theta$ by a signal representing $\tan\omega$ to obtain a product signal representing $-\cos\theta\tan\omega$, adding said product signal to a signal representing $\sin \theta$ to obtain a signal representing $\sin \theta - \cos \theta \tan \omega$, multiplying a signal representing $\sin \theta$ by a signal representing $\tan \omega$ to obtain a second product signal representing $\sin \theta \tan \omega$, and adding said second product signal to a signal representing $\cos \theta$ to obtain a signal representing $\cos \theta + \sin \theta \tan \omega$, where $$\sin \theta - \cos\theta \tan \omega = K \sin (\theta - \omega),$$

$$\cos \theta + \sin \theta \tan \omega = K \cos (\theta - \omega), \text{ and}$$

$$K \text{ is a constant} = 1/\cos \omega.$$

3. The method specified in claim 1 wherein the step of converting said remaining approximate angle $X$ into a group of binary digital code output bits comprises the steps of, generating a pair of voltage signals proportional respectively to $\sin \phi$ and $A \cos \phi + B \sin \phi$, applying the voltage signal proportional to $A \cos \phi + B \sin \phi$ as a reference voltage signal to circuitry capable of successively comparing different fractions of said reference voltage signal against a second voltage signal applied thereto and generating a group of binary digital code output bits representing an approximation of the ratio of said second voltage signal divided by said reference voltage signal, and applying the signal proportional to $\sin \phi$ to said circuitry as said second voltage signal, whereby the binary digital code produced by said circuitry is indicative of the quantity ($\sin \phi/A \cos \phi + B \sin \phi$).

4. The conversion method specified in claim 1 and further comprising the additional steps of, registering in binary storage the binary digital code output bits produced by said successive approximation analog-to-digital conversion technique, detecting the octant in which said unknown input synchro angle exists, and controlling the stored binary digital code output bits to complement said stored binary digital code when said unknown input synchro angle is detected as occurring in an even-numbered octant.

5. Synchro-to-digital conversion apparatus for converting synchro data received in the form of a first pair of signals representing the sine and cosine respectively of an unknown input angle equal to or less than 45°, comprising in combination, first angle subtraction circuit means responsive to said first pair of signals for manipulating said signals to subtract the trigonometric equivalent of an angle of 22.5° from said unknown input angle, first signal producing circuit means operably connected to first angle subtraction circuit means and responsive to the result of the angle subtraction performed by said first angle subtraction circuit means for producing a second pair of signals representing the sine and cosine respectively of a first resultant angle equal to or less than 22.5°, said first resultant angle corresponding respectively to said unknown input angle if said unknown input angle is less than 22.5° and to said unknown input angle less 22.5° if said unknown input angle is greater than 22.5°, second angle subtraction circuit means responsive to said second pair of signals for manipulating said second pair of signals to subtract the trigonometric equivalent of an angle of 11.25° from said first resultant angle, second signal producing circuit means operably connected to said second angle subtraction circuit means and responsive to the result of the angle subtraction performed by said second angle subtraction circuit means for producing a third pair of signals representing respectively the sine and cosine of a second resultant angle equal to or less than 11.25°, said second resultant angle corresponding respectively to said first resultant angle if said first resultant angle is less than 11.25° and to said first resultant angle less 11.25° if said first resultant angle is greater than 11.25°, linear approximation circuit means for manipulating said third pair of signals to perform a linear approximation of said second resultant angle according to the equation $$\text{Angle } X \text{ (in degrees)} = 11.25 (\sin \phi/\text{A} \cos \phi + \text{B} \sin \phi)$$

where angle $X$ is the remaining approximate angle to be converted to binary bit form, $\phi$ is said second resultant angle between 0° and 11.25°, and $A$ and $B$ are constants of predetermined value selected in accordance with desired accuracy, and means for converting said remaining angle $X$ into a group of binary digital code output bits by a successive approximation analog-to-digital conversion technique.

6. The synchro-to-digital conversion apparatus specified in claim 5 wherein each of said first and second angle subtraction circuit means generate a pair of output signals representing respectively the sine and cosine of the difference angle resulting from the associated angle subtraction of a known angle from an unknown input angle and wherein each of said first and second signal producing means comprises, detecting circuit means operably connected to receive the output signal representing the sine of the difference angle resulting from the angle subtraction performed by the connected angle subtraction circuit means for detecting whether the sine of said difference angle is positive or negative, and circuit means operably connected to said sine detecting circuit means for selectively causing said signal producing means to produce a pair of signals representing the sine and cosine of said difference angle if the sine of said difference angle is positive or a pair of signals representing the sine and cosine of the unknown input angle applied to said connected angle subtraction circuit means if the sine of said difference angle is negative.

7. The synchro-to-digital conversion apparatus specified in claim 5 wherein each of said first and second angle subtraction circuit means for subtracting a known angle $\omega$ from an unknown angle $\theta$ comprises, a first operational amplifier having an output connection and an input connection connected to an input summing junction, a feedback resistor of first predetermined value connected between said output connection and said input summing junction, a first input resistor of said predetermined value having one end connected to said input summing junction and having its other end connected to receive a signal representing sin $\theta$, a second input resistor of a value $1/\tan \omega$ multiplied by said predetermined value and having one end connected to said input summing junction and having its other end connected to receive a signal representing $-\cos \theta$, a second operational amplifier having an output connection and a pair of opposite polarity input connections, each of said opposite polarity input connections having an associated input summing junction connected thereto, a feedback resistor of second predetermined value having one end connected to the output connection of said second operational amplifier and its other end connected to one of said input summing junctions for said second operational amplifier, a resistor of said second predetermined value having one end connected to said one input summing junction for said second operational amplifier and having its other end connected to receive said signal representing $-\cos \theta$, a second resistor of said second predetermined value having one end connected to the other input summing junction for said second operational amplifier and having its other end connected to receive said signal representing sin $\theta$, and a resistor having a value $(\tan \omega/2 - \tan \omega)$ multiplied by said second predetermined value and having one end connected to said other summing junction for said second operational amplifier and having its other end connected to ground.

8. The synchro-to-digital conversion apparatus specified in claim 7 wherein each of said first and second angle subtraction circuit means further includes switch means responsive to the result of the angle subtraction performed by the associated angle subtraction circuit means for disconnecting said first operational amplifier from said $-\cos \theta$ signal and said operational amplifier from said sin $\theta$ signal if said known angle $\omega$ is greater than said unknown angle $\theta$, whereby the output from said first operational amplifier is a signal representing either sin $(\theta - \omega)$ or sin $\theta$ and the output from said second operational amplifier is a signal representing either cos $(\theta - \omega)$ or cos $\theta$ depending respectively upon whether said known angle $\omega$ is less than or greater than said unknown angle $\theta$.

9. The synchro-to-digital conversion apparatus specified in claim 8 further including circuit means responsive to the output signal produced by said first operational amplifier of each of said first and second angle subtraction circuit means for detecting whether the polarity of the output signal from said first operational amplifier is negative, and said switch means being operated to disconnect said first and second operational amplifiers in the associated angle subtraction circuit means if said detecting circuit means determines that the output signal from said first operational amplifier is negative in polarity.

10. The synchro-to-digital conversion apparatus specified in claim 5 further including means responsive to input synchro data for detecting the octant in which the input synchro angle exists, and means responsive to said octant detecting means for generating a digital binary code representing the octant of said input synchro angle.

11. The synchro-to-digital converter apparatus specified in claim 10 further including register means comprising a plurality of digital binary storage stages for storing the digital binary output code bits representing the successive approximation of said remaining angle *X*.

12. The synchro-to-digital converter apparatus as specified in claim 11 further including means responsive to the octant code produced by said octant code generating means for controlling said binary digital register means to store the complement of the output of said successive approximation means when said octant code indicates that said synchro angle lies in an even-numbered octant.

13. The conversion apparatus specified in claim 7 wherein each of said first and second angle subtraction circuit means includes, switch means for disconnecting said second input resistor of the value $1/\tan \omega$ multiplied by said predetermined value from the signal representing $-\cos \theta$ and for disconnecting said second resistor of said second predetermined value from the signal representing sin $\theta$, whereby said conversion apparatus can be utilized as a scalar-to-binary digital converter when said signals representing sin $\theta$ and $-\cos \theta$ are replaced by signals representing respectively an unknown scalar quantity and an associated reference quantity.

* * * * *